United States Patent [19]

Kurakake

[11] Patent Number: 5,187,656
[45] Date of Patent: Feb. 16, 1993

[54] SERVOMOTOR DRIVE CONTROL SYSTEM

[75] Inventor: Mitsuo Kurakake, Hino, Japan

[73] Assignee: Fanuc Ltd., Minamitsuru, Japan

[21] Appl. No.: 799,725

[22] Filed: Nov. 22, 1991

Related U.S. Application Data

[63] Continuation of Ser. No. 653,750, Feb. 11, 1991, abandoned, which is a continuation of Ser. No. 517,413, Apr. 26, 1990, abandoned, which is a continuation of Ser. No. 258,084, Oct. 14, 1988, abandoned, which is a continuation of Ser. No. 879,101, Jun. 5, 1986, abandoned.

[30] Foreign Application Priority Data

Dec. 25, 1984 [JP] Japan ............................ 59-277877

[51] Int. Cl.$^5$ .................................... G05B 19/417
[52] U.S. Cl. ............................ 364/167.01; 364/132; 364/474.11
[58] Field of Search ............... 364/131–136, 364/474.01, 474.11, 167.01; 318/562, 568.11, 599; 395/80, 88

[56] References Cited

U.S. PATENT DOCUMENTS

| | | | |
|---|---|---|---|
| 4,029,950 | 6/1977 | Haga | 364/474 X |
| 4,034,354 | 7/1977 | Simmons | 364/900 |
| 4,138,632 | 2/1979 | Pauwels et al. | 318/599 X |
| 4,281,379 | 7/1981 | Austin | 364/132 |
| 4,435,771 | 3/1984 | Nozawa et al. | 364/474 |
| 4,459,655 | 7/1984 | Willemin | 364/132 |
| 4,467,436 | 8/1984 | Chance et al. | 364/133 X |
| 4,514,814 | 4/1985 | Evans | 364/132 X |
| 4,562,393 | 12/1985 | Loyzim et al. | 318/599 |
| 4,599,548 | 7/1986 | Schultz | 318/599 |

FOREIGN PATENT DOCUMENTS 2086085 5/1982 United Kingdom.

Primary Examiner—Joseph Ruggiero
Attorney, Agent, or Firm—Staas & Halsey

[57] ABSTRACT

According to the servomotor drive control system of the invention, a processing section and a servomotor are arranged at physically separate locations. Data are exchanged via a data bus between a main CPU, which performs input data processing and sequence processing, and the processing section. As a result, servomotor drive commands and feedback data can be transferred at high speed without requiring a special interface device, and an arithmetic circuit section is separated from the environment in which the servomotor is installed.

3 Claims, 2 Drawing Sheets

SERVOMOTOR DRIVE CONTROL SYSTEM

This application is a continuation of application Ser. No. 07/653,750, filed Feb. 11, 1991, now abandoned, which is a continuation of application Ser. No. 07/517,413 filed Apr. 26, 1990, which is a continuation of application Ser. No. 07/258,084, filed Oct. 14, 1988, now abandoned, which is a continuation of application Ser. No. 06/879,101, filed on Jun. 5, 1986, now abandoned.

BACKGROUND OF THE INVENTION

This invention relates to a drive control system of a servomotor for driving a load such as a machine tool.

In order to control a multiple-axis machine tool or the like with a high degree of accuracy, use is made of a servomotor driven by a command signal from a numerical control unit (hereafter referred to as an NC unit) or the like. Conventionally, servomotors of this type are driven by analog servo systems. However, with the progress that has recently been made in the technical development of computer control, various expedients dealing with the question of how to control a plurality of servomotors efficiently by a single control unit have been devised.

FIG. 2 is a block diagram illustrating the general features of such a servomotor control circuit. As shown in the Figure, a main CPU 1 of microprocessor executing predetermined processing, and a plurality of executing predetermined processing, and a plurality of shared RAMs 2, are connected to an NC unit side by a data bus B1. A servo-control CPU 3 of microprocessor construction is connected to each of the shared RAMs 2 via a bus B2 and outputs an analog signal indicative of a velocity command to each servoamplifier 4 associated with a servomotor. The servoamplifier 4 comprises a velocity control circuit 5, a current control circuit 6 and an inverter 7 and subjects a servomotor 8 to prescribed feedback control on the basis of current, position and velocity.

Each shared RAM 2 is for performing an exchange of data between the main CPU 1 and the servo-control CPU 3. For example, a signal indicative of the position of the servomotor 8 is temporarily stored in the shared RAM 2 through the servo-control CPU 3, and the main CPU 1 reads out this stored value to perform display processing and the like. Further, a position command signal from the main CPU 1 is temporarily stored in the shared RAM 2 and the servo-control CPU 3 reads out this stored value and outputs a velocity command to the servoamplifier 4.

In such digital servomotor control, it is considered to provide the servo-control CPU and the servoamplifier on the servo side, namely close to the load, such as a machine tool, driven by the servomotor. With the above control system, however, the environment in which the CPU is installed is undesirable for the electronic circuitry in view of vibration and temperature. Such an environment is a cause of failure and malfunction, especially for a CPU using an IC having a high degree of integration. Since complex circuitry for position, current and other control functions is provided on the load side, adjustments and maintenance performed by a serviceman or the like are accompanied by complications and hazards. Problems are also encountered in terms of operating efficiency.

Furthermore, since the main CPU and the CPU on the servo side are remote from each other, a high-speed interface device is necessary to transfer data. A problem that results is higher cost.

SUMMARY OF THE INVENTION

An object of the present invention is to provide a servomotor drive control system in which the servo-control CPU is provided on the NC unit side and is connected to the main CPU by the main CPU data bus, thereby greatly reducing the control circuitry provided on the servo side and enabling data to be transferred at high speed.

The present invention provides a servomotor drive control system in which a drive command signal and data fed back from a servomotor are processed to drive and control the servomotor, characterized by having a main CPU for performing input data processing and sequence processing, a numerical control unit coupled to the main CPU and having a servo-control CPU for controlling current, velocity and position of the servomotor, and a data bus interconnecting the numerical control unit and the servomotor for exchanging command data and detection data.

The servomotor drive control system according to the present invention has the processing section and the servomotor arranged remote from each other. Consequently, it is possible to transfer servomotor drive commands and feedback data between the processing section and the servomotor at high speed without requiring a special interface device.

Further, the major portion of such complex control circuitry as the servo-control CPU and the main CPU that performs the input data processing and sequence processing is arranged on the NC unit side, and only the minimum number of circuit elements need be provided on the load side. As a result, operator maintenance and control operations are simplified, and it is possible to prevent control apparatus failure and malfunction caused by such environmental conditions as vibration and heat.

DESCRIPTION OF THE PREFERRED EMBODIMENT

An embodiment of the present invention will now be described in detail with reference to the drawings.

Figure 1:
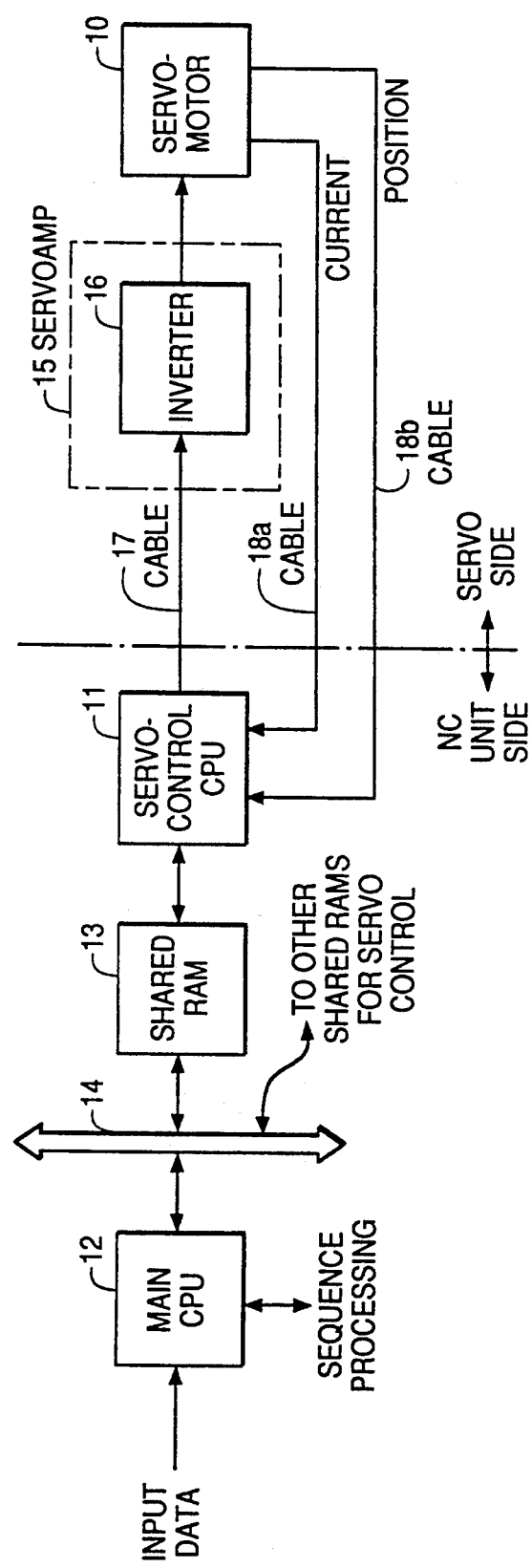
FIG. 1 is a block diagram illustrating an embodiment of the present invention.
Figure 2:
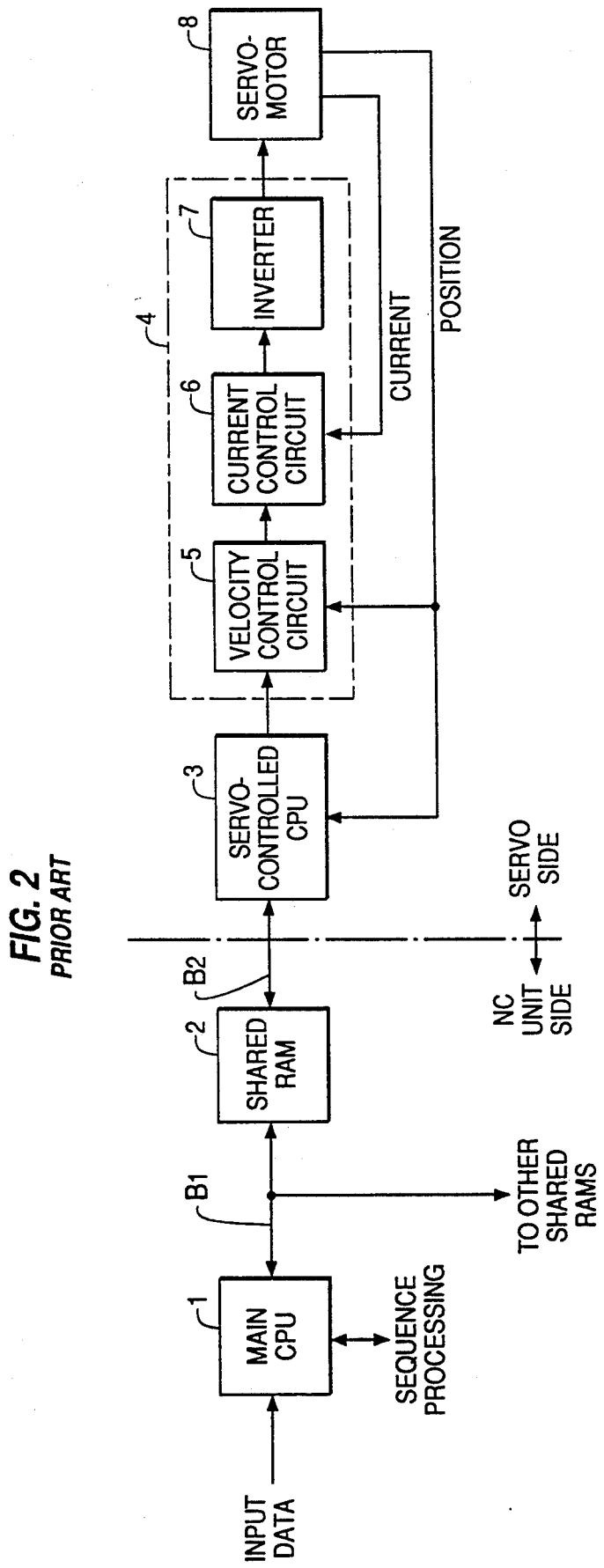
FIG. 2 is a block diagram illustrating an example of a conventional servomotor drive control system.

FIG. 1 is a block diagram of an embodiment of the present invention, in which one (or a plurality of) servo-control CPU 11 for controlling the current, velocity and position of a servomotor 10 is arranged in an NC unit along with a main CPU 12 and a shared RAM 13, and is connected to the main CPU 12 by a data bus 14. An example of an application in which a plurality of servo-control CPUs 11 are provided is one where a servo circuit for driving various articulations of a robot having plural degrees of freedom is to be controlled. The servo-control CPU 11 provides a servoamplifier 15 with a pulse-width modulated (PWM) command in the form of a digital signal. Accordingly, an inverter 16 in the servoamplifier 15 is constructed to include only final stage driver elements such as power transistors. In other words, almost all complicated control circuit elements are disposed on the NC side, and only the minimum number of circuit elements such as the power transistors are disposed in a control panel on the load side.

Numeral 17 denotes a cable for sending digital signals such as the PWM command from the NC unit side to the servoamplifier 15. Numerals 18a and 18b denote cables for feeding back current and position data, respectively, from the servomotor 10 to the NC unit side.

With a servomotor control system so constructed, the main CPU 12, which reads in input data and performs predetermined sequence control, applies a drive command for each servomotor 10 to the servo control CPU via the shared RAM 13. The servo-control CPU sends current, velocity and position control signals to the servo side via the cable 17. In response to these control signals, the servoamplifier 15 drives the servomotor 10. Signals indicative of the current and position of the servomotor 10 are fed back to the NC unit side via the cables 18a and 18b.

Accordingly, the servo-control CPU 11 and the main CPU 12 are both located within the NC unit, and data are transferred between them at high speed via the shared RAM 13. If a plurality of servomotors are to be driven and controlled, this can be accomplished efficiently through an arrangement in which the main CPU is coupled to CPUs dedicated to respective ones of the servomotors. Moreover, since the arithmetic circuitry is remote from the environment in which the servomotor is installed, failures and malfunctions due to vibration and heat can be reduced and both maintenance and inspection are facilitated.

The present invention is not limited to the above-described embodiment. Outstanding results can be obtained even if the invention is applied to a control system based on various data other than data relating to position and velocity. Such applications do not depart from the scope of the invention.

The servomotor drive control system according to the invention enables servomotor drive commands and feedback data to be transferred at high speed without requiring a special interface device. In addition, since the major portion of the complicated control circuitry is arranged on the NC unit side and only the minimum number of circuit elements are disposed on the load side, control of a machine tool or the like is simplified and it is possible to prevent control apparatus failures and malfunctions caused by such environmental conditions as vibration and temperature.

I claim:

1. A servomotor drive control system in which a drive command signal and data fed back from a servomotor are processed to drive and control the servomotor, said servomotor drive control system comprising:
   a numerical control unit portion including:
      a main CPU for performing input data processing and sequence processing and supplying a drive command;
      a servo-control CPU, connected between said main CPU and the servomotor, for storing feedback data and pulse width modulated (PWM) command data in digital form for controlling current, velocity and position of the servomotor and for receiving the drive command from said main CPU; and
      a shared random access memory connected between said main CPU and said servo-control CPU;
   a servo-side portion including:
      data transfer means, connected to said numerical control unit portion, for receiving the PWM command data for controlling current, velocity and position of the servomotor from said servo-control CPU and feeding back the command data and detected data between said numerical control unit portion and the servo-side portion during a high speed operation; and
      drive means, connected to said data transfer means, including final stage drivel elements required to effect servo-control on the servomotor in accordance with the command data.

2. A servomotor drive control system according to claim 1, wherein said numerical control unit includes a plurality of servo-control CPUs, connected between said main CPU and the servomotor, for controlling current, velocity and position of the servomotor.

3. A servomotor drive control system according to claim 2, further comprising a servo-circuit, wherein said servo-control CPUs are connected to said servo-control, for controlling said servo-circuit for driving articulations of an industrial robot.

* * * * *

UNITED STATES PATENT AND TRADEMARK OFFICE
CERTIFICATE OF CORRECTION

PATENT NO. : 5,187,656
DATED : FEBRUARY 16, 1993
INVENTOR(S) : Mitsuo KURAKAKE

It is certified that error appears in the above-identified patent and that said Letters Patent is hereby corrected as shown below:

Col. 1, line 29, "microprocessor execut-" should be
--microprocessor construction which is for reading in input data and execut- --  ;
line 30, "execut-" should be deleted;
line 31, "ing predetermined processing, and a plurality of" should be deleted;
line 32, "RAMs 2," should be --RAMs 13,--.

Col. 4, line 33, "drivel" should be --driver--.

Signed and Sealed this

Fourth Day of January, 1994

Attest:

BRUCE LEHMAN

Attesting Officer

Commissioner of Patents and Trademarks